July 20, 1965 H. P. ASCANIO ETAL 3,195,403

QUESTION AND HIDDEN ANSWER PROJECTOR GAME APPARATUS

Filed May 29, 1962 4 Sheets-Sheet 1

INVENTORS
HORACE P. ASCANIO,
PAUL C. VIENNA,
BY

McMorrow, Berman + Davidson
ATTORNEYS.

July 20, 1965 H. P. ASCANIO ETAL 3,195,403
QUESTION AND HIDDEN ANSWER PROJECTOR GAME APPARATUS
Filed May 29, 1962 4 Sheets-Sheet 3
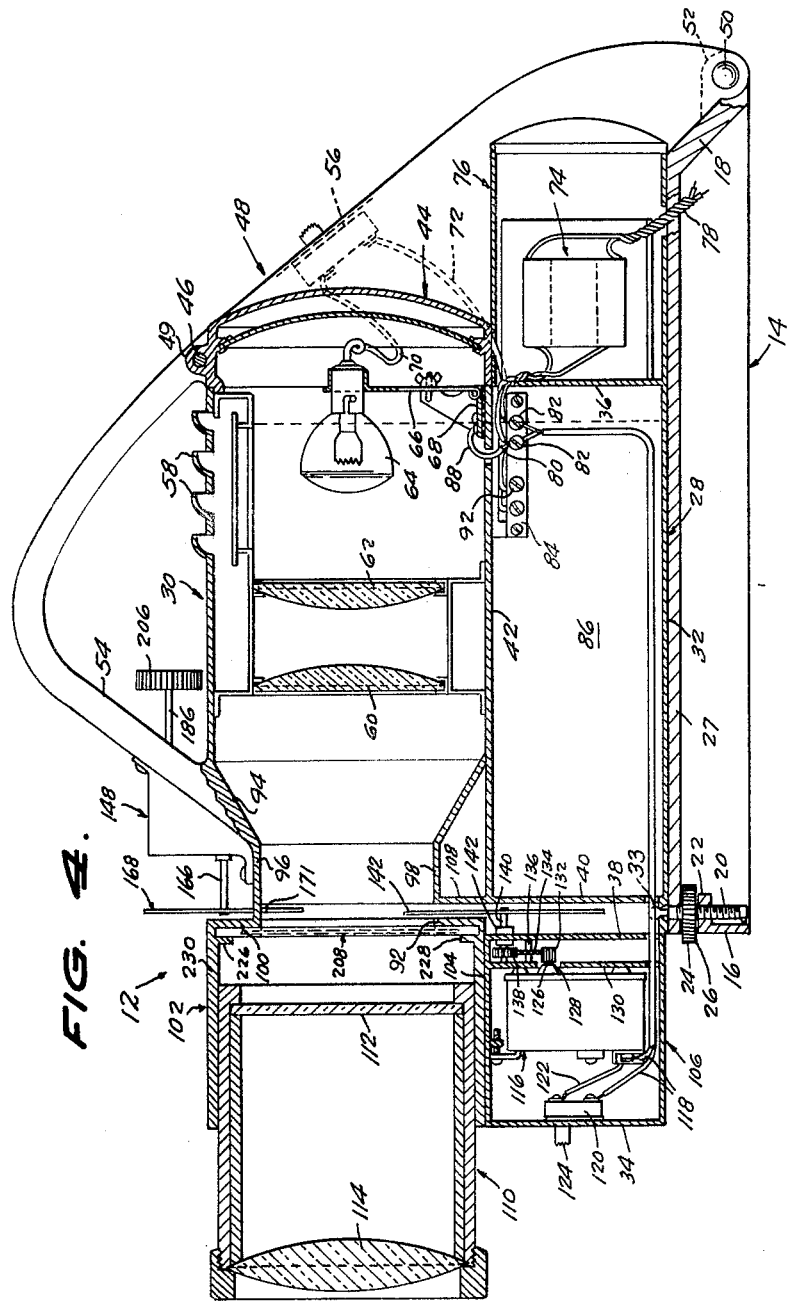
INVENTORS
HORACE P. ASCANIO,
PAUL C. VIENNA,
BY
McMorrow, Berman + Davidson
ATTORNEYS.

July 20, 1965 H. P. ASCANIO ETAL 3,195,403
QUESTION AND HIDDEN ANSWER PROJECTOR GAME APPARATUS
Filed May 29, 1962 4 Sheets-Sheet 4

INVENTORS
HORACE P. ASCANIO,
PAUL C. VIENNA,
BY
McMorrow, Berman + Davidson
ATTORNEYS.

United States Patent Office 3,195,403
Patented July 20, 1965

3,195,403
QUESTION AND HIDDEN ANSWER PROJECTOR GAME APPARATUS
Horace P. Ascanio, 3903 Brookside Drive, and Paul C. Vienna, 3820 Brookside Drive, both of Pittsburg, Calif.
Filed May 29, 1962, Ser. No. 198,605
8 Claims. (Cl. 88—26)

This invention relates to novel projector game apparatus involving slides containing comic or serious question and answer material areas, for entertainment and instruction, and means for timing the duration of projection of the question material areas and for delaying projection of the answer material areas until near the end of the period of projection of the question material areas.

The primary object of the invention is the provision of highly amusing and instructive, efficient, and easily operated apparatus of the kind indicated, including slides usable therewith, which enables and facilitates the playing by single or multiple participants of competitive quiz games involving any desired categories of humorous or comic subjects or of serious or educational subjects, wherein the participants are required to arrive at and announce answers to questions projected on a screen, within a predetermined period of time of exposure thereof, and before the answers are projected onto the screen.

Another object of the invention is the provision, in apparatus of the character indicated above, of shutters which are arranged to occlude the answer areas of the slides and be operated by an elapsed time motor or by hand, and a motorized timing disc which has thereon a circle of numerals, either in the form of transparencies or of cut-outs, which shows the participants the passing of the time of duration of projection of the question material of a slide.

Other important objects and advantageous features of the invention will be apparent from the following description and the accompanying drawings, wherein, for purposes of illustration only, specific forms of the invention are set forth in detail.

In the drawings:

FIGURE 4 is a further enlarged vertical longitudinal section taken on the line 4—4 of FIGURE 3;

Figure 1:
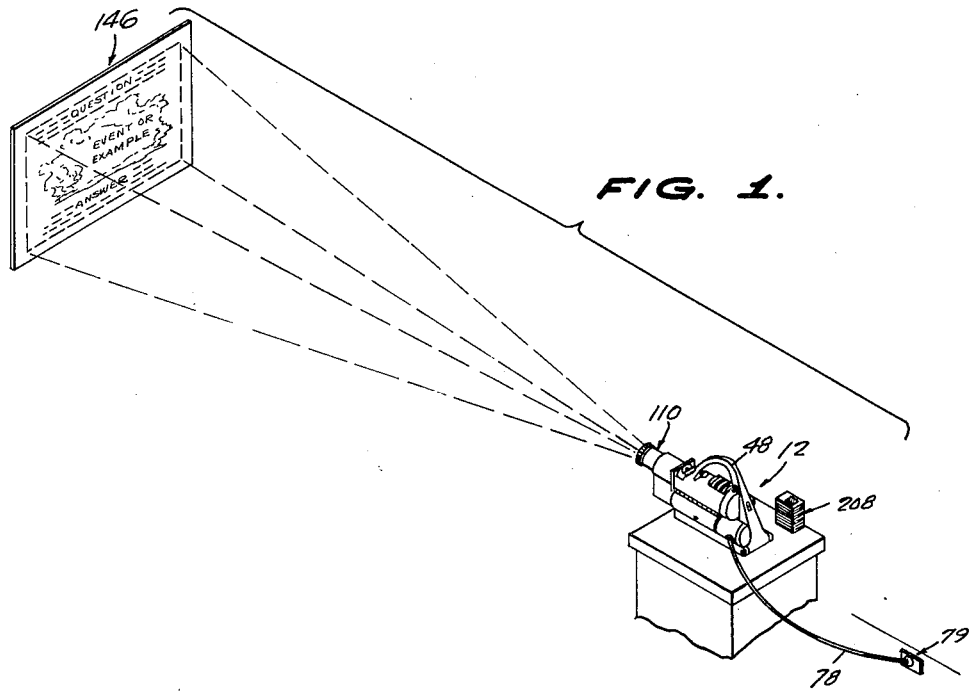
FIGURE 1 is a schematic perspective view showing a projector projecting a slide onto a projection screen, in accordance with the present invention.
Figure 2:
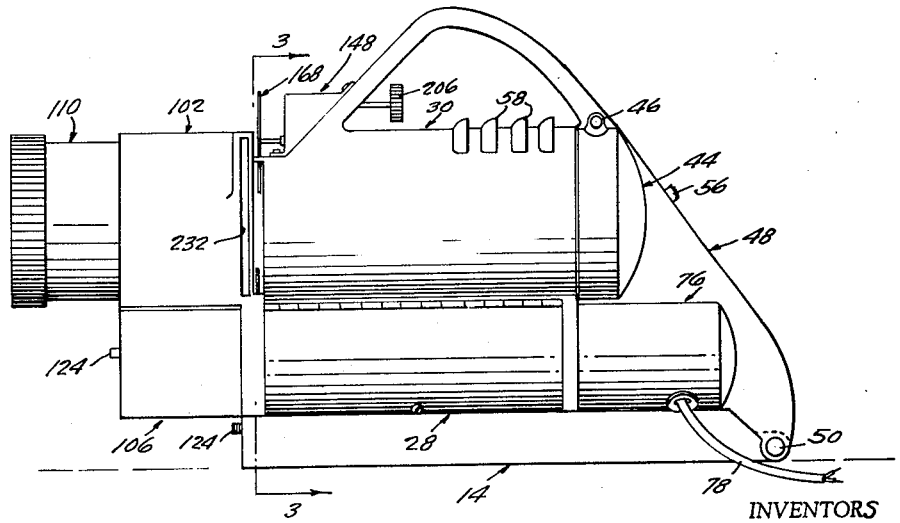
FIGURE 2 is an enlarged left-hand side elevation of said projector.

Referring in detail to the drawings, wherein like and related numerals designate like and related parts throughout the several views, and first to FIGURES 1 through 6, the projector illustrated therein and generally designated 12, comprises a longitudinally elongated and preferably inverted pan-shaped base 14, having a perpendicular forward wall 16, and rearwardly declining rear wall 18. A vertical levelling screw 20 is threaded through a rearwardly extending bracket 22, on the forward wall 16, and has an enlarged diameter hand wheel 24 thereon, whose forward edge is exposed through a slot 26, in the forward wall 16, above the bracket 22. The screw 20 extends upwardly through the top wall 27 of the base 14, and has a reduced neck 29, on its upper end, topped by a ball 31, which is confined in a socket 33 in the bottom wall 32 of the lower section of a housing, whereby the housing is adjustable upwardly and downwardly, relative to the base, on the axis of a pivot 50, as hereinafter described.

A longitudinally elongated housing is supported upon the base 14, and comprises a rectangular lower housing section 28 and a cylindrical upper section 30. The lower housing section 28 has a bottom wall 32, which rests upon the base 14, and perpendicular forward and rear end walls 34 and 36, respectively. Spaced perpendicular intermediate walls 38 and 40 are located near to and are rearwardly spaced from the forward end wall 34. The top of the lower housing section 28 is closed by the side wall 42 of the cylindrical upper section 30, which extends between and is fixed to the intermediate wall 40 and the rear end wall 36. The open rear end of the cylindrical upper section 30 is normally closed by a movable cup-shaped door 44, which is pivoted, as indicated at 46, at its top, to an upstanding ear 49, on the top of the upper section 30. A normally forwardly inclined lever 48, has, at its lower end an ear 52, extending rearwardly from the rear wall 18 of the base 14 and journaled on the pivot 50. The lever 48 has a forwardly declining terminal 54, on its forward end, which is fixed to the top of the upper section side wall 42. The lever 48 carries an on-and-off switch 56. The top of the upper housing section side wall 42 is provided with louvers 58.

Axially supported in the cylindrical upper housing section 28, and spaced from its ends, is a pair of plano-convex lenses 60 and 62 having their convex sides in facing relationship. An axially arranged electric light bulb 64 is supported on an upstanding bracket 66, mounted, as indicated at 68, upon the upper housing section side wall 42, at the rear end thereof, and has one side thereof connected by an insulated wire 70, to one side of the switch 56. An insulated wire 72 leads from the other side of the switch to one side of the secondary of a step-down transformer 74, which is enclosed in a cylindrical housing 76 fixed to and extending rearwardly from the lower housing section 28, at one side of the lever 48, and whose forward end is closed by the rear wall 36. Leads 78, from the primary of the transformer 74 extend down through the base 14, for connection with an available convenient alternating current outlet 79. The other side of the secondary of the transformer 74 is connected by an insulated wire 80 to one of a pair of binding posts 82 on an insulated board 84, mounted to a side wall 86 of the lower housing section 28, and another insulated wire 88 leads from one of the binding posts 82 to the bulb bracket 66, which is insulated from the upper housing section side wall 42, as indicated at 90. The binding post board 84 can have an additional pair of binding posts 92, connected to the bracket 66 and to the switch 56, to which the related sides of a battery (not shown) are adapted to be connected, for battery operation of the projector 12.

The upper housing section 30 is tapered, at its forward end, as indicated at 94, to a straight cylindrical axial tube 96, whose side wall 98 is connected, at its forward end, to the edge of an axial opening 98' provided in an internal flange 100 of a cylindrical lens tube housing 102, which rests upon the top wall 104 of a timer motor housing 106, which is closed, at its forward end, by the forward end wall 34 of the lower housing section 28, and at its rear end, by the intermediate wall 38 thereof. The side wall 98 of the tube 96 is connected at its bottom, with the upper section side wall 42, as indicated at 108, but is unconnected to and is rearwardly spaced from the internal flange 100.

A lens tube 110 is slidably telescoped into the housing 102 and has a plain glass 112 mounted therein, adjacent to its rear end, and a double-convex projecting lens 114 adjacent to its forward end.

An electric timer motor 116 is contained within the housing 106, and insulated wires 118 lead from the binding posts 82 into the housing 106, one of the wires 118 being connected to one side of an on-and-off push-button switch 120 mounted on the forward end wall 34, and the other wire 118 to one side of the motor 106, whose other side is connected by a wire 122 to the remaining side of the switch. The actuating button 124 of the switch 120 extends forwardly from the forward end wall 34.

The timer motor 116 has a horizontal drive shaft 126 which extends rearwardly through an opening 128 in a perpendicular partition wall 130, spaced forwardly from the intermediate wall 38, and has a drive pinion 132 thereon which is in mesh with an idler gear wheel 134, on a shaft 136 journalled, at its ends in the walls 130 and 38. The idler gear wheel 134 is in mesh with a gear wheel 138 on a shaft 140 which is journaled through a bearing 142, carried by the intermediate wall 38, and has its forward end journaled on the petition wall 130. The shaft 140 carries, on its rear end, in the space between the intermediate walls 38 and 40, a timer disc 142. The disc 142 is large enough in diameter so that its upper edge reaches upwardly into the lower part of the opening 98' of the internal flange 100. The timer disc 142 has, around its peripheral edge, a circle of numerals 144, as from zero to twenty, representing seconds, the numerals 144 being either transparencies or cut-outs, through which light from the bulb 64, projected through the lenses 60 and 62, can pass and be projected onto a viewing screen 146, placed at a suitable distance from the projector 12.

Figure 3:
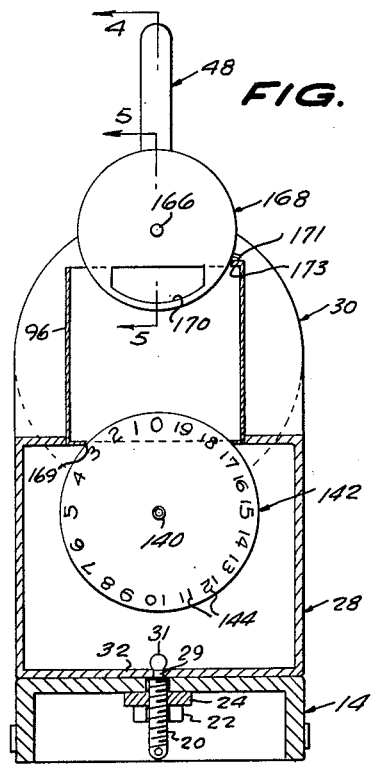
FIGURE 3 is a vertical transverse section taken on the line 3—3 of FIGURE 2.
Figure 5:
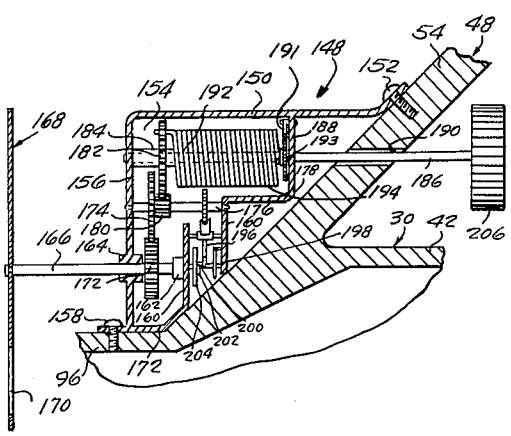
FIGURE 5 is a still further enlarged fragmentary vertical longitudinal section taken on a line 5—5 of FIGURE 3.

A spring wound elapsed time motor 148 is mounted upon the top of the taper 94 of the upper housing section 30, and is enclosed, as shown in FIGURE 5, in a housing composed of a horizontal top wall 150, connected, at its rear end, as indicated at 152, to the lever terminal, side walls 154, and a perpendicular forward wall 156. The forward wall 156 is anchored, as indicated at 158, to the taper, and has a rearwardly extending bracket, on its lower end, which includes an upright 160, spaced rearwardly from the forward wall 156. The upright 160 and the forward wall 156 have bearings 162 and 164, respectively, through which a horizontal shutter shaft 166 is journaled which carries, on its forward end, a shutter disc 168, which as shown in FIGURE 3, has a chordal opening 170, adjacent to its peripheral edge, for exposing, when registered therewith, an answer material area on a slide. The lower part of the shutter disc 168 extends downwardly through a transverse opening 169, provided in the upper housing section tube 96. The shutter disc 168 has a radial stop pin 171, on its peripheral edge, which, at the end of a predetermined elapsed time, is adapted to engage the top of the tube 96 and stop the disc with its opening registered with the answer material area of a slide, and in a starting position with the underside of a flange 173 on the tube 96, as shown in FIGURES 3 and 4, respectively.

The shutter shaft 166 has a gear wheel 172, between the forward wall 156 and the upright 160, which is in mesh with a motion transfer gear wheel 174 on a horizontal shaft 176, above the shutter shaft, which is journaled, at its ends, in the forward wall 156 and an upright portion 160 of a partition wall 178, and has thereon a reduced diameter pinion 180. The pinion 180 is in mesh with a gear wheel 182 fixed on a sleeve 184 which is journaled on a wind shaft 186 which is above the shaft 176, and is journaled through the forward wall 156 and through the upper part 188 of the partition wall 178.

The wind shaft 186 extends freely through a bore 190 provided in the lever terminal 54. A coil drive spring 192 surrounds the sleeve 184, has one end thereof anchored to the wind shaft 186 and its other end anchored to the gear wheel 182. A ratchet dog 191 on the upper partition wall portion 188 engages a ratchet wheel 193 fixed on the wind shaft 186, to prevent retrograde rotation of the wind shaft with the spring 192 under wound tension.

The elapsed time motor 148 further comprises an escapement which comprises a gear wheel 194, fixed on the motion transfer shaft 176, with which the upper end of a pawl 196 is engaged, the pawl 196 being fixed on a shaft 198 which is journaled, at its ends, in the upright 160 and the lower portion 160 of the partition wall 178. The lower end of the pawl 196 has thereon a lateral, forwardly extending pin 200, which is engageable by an eccentric cam 202, on the rearward side of a wheel 204, on the shaft 198. The motor 148 is wound by rotating the wind shaft 186, by means of a knob 206, on its rear end, in a direction to torsionally tension the drive spring 192, whereby the opening 170 of the shutter disc 168 will come, after a predetermined lapse of time, near the end of the duration of projection of question material area, on a slide, into registry with and expose for projection, the answer material on the slide.

Figure 6:
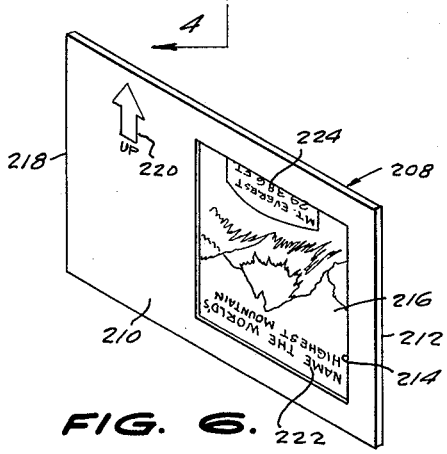
FIGURE 6 is a perspective view of a slide.

A typical slide 208, shown in FIGURE 6, comprises a horizontally elongated rectangular opaque plate 210 which has adjacent to its leading end 212, a rectangular opening 214, across which a transparency 216 extends. The plate 210 has, between the opening 214 and its trailing end 218, an upwardly pointing arrow 220, which is reversed with respect to the subject matter on the transparency 216, for proper and erect projection thereof.

A question material area 222 extends across the bottom of the transparency 214, in inverted position, and an answer material area 224, also inverted, extends across the top of the transparency, and is of the same area as the opening 170 of the shutter disc, so as to be occluded while the shutter disc opening is unregistered therewith and to be exposed, for projection, with the opening registered therewith.

The slide 208 is slidably supported across the rear end of the projecting lens tube housing 102, and against the forward side of the internal flange 100, by means of upper and lower ribs 226 and 228, respectively, on the side wall 230 of the lens tube housing 102 and spaced forwardly from the flange 100, the opposite sides of the sidewall 130 having vertical slots 232, through which the slide 208 is positioned with the transparency 216 registered with the axis of the lens system and the flange opening.

The operation of the projector 12 is believed to be obvious from the above description, which is augmented by stating that at the end of each projection of a slide 208, the timer motor 116 is shut off, and the elapsed time motor 148 rewound or reset, to start from zero, and the timer motor and the elapsed time motor restarted for each subsequent pojection.

Figure 7:
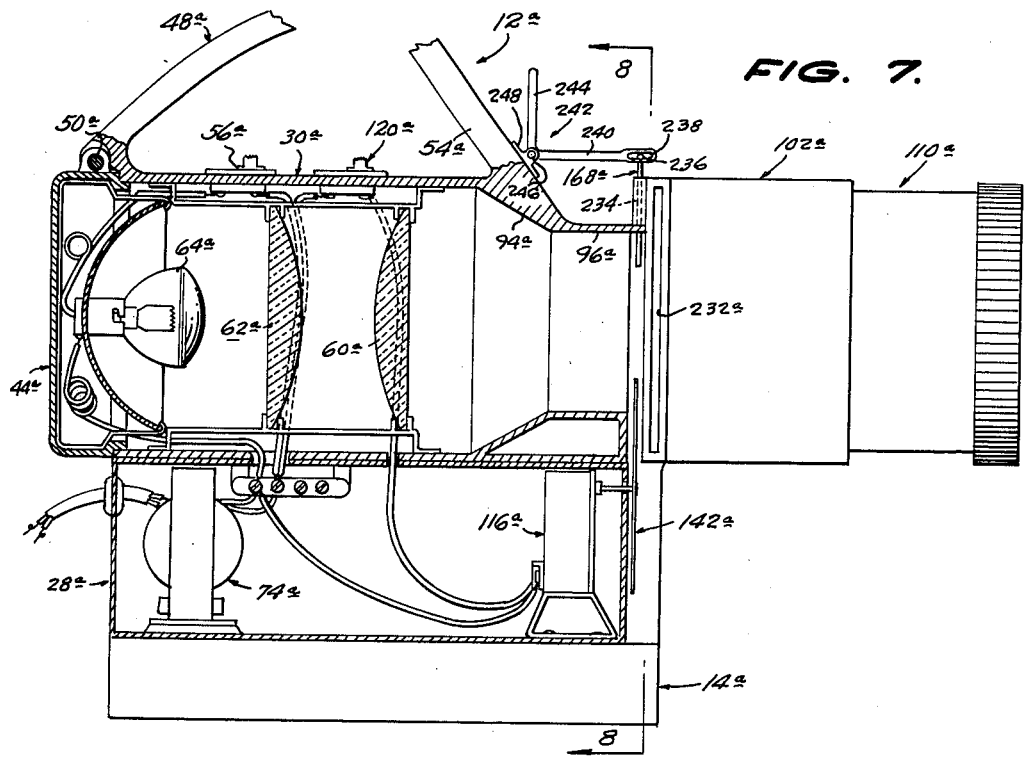
FIGURE 7 is a view like FIGURE 4, partly broken away, of another form of projector.
Figure 8:
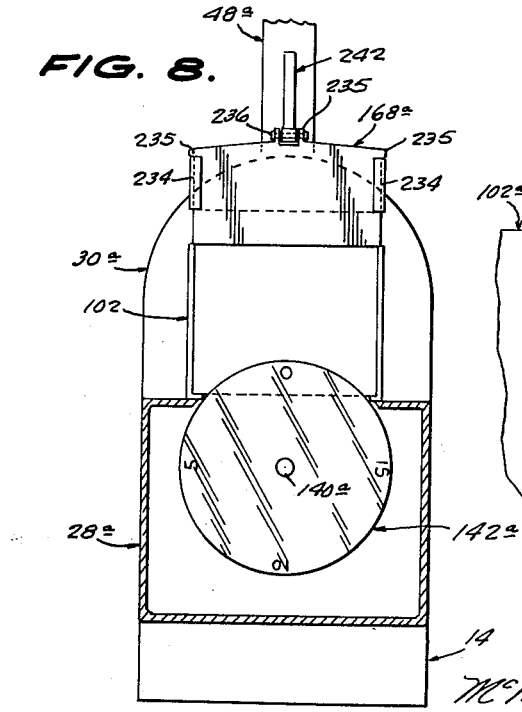
FIGURE 8 is a vertical transverse section taken on the line 8—8 of FIGURE 7.
Figure 9:
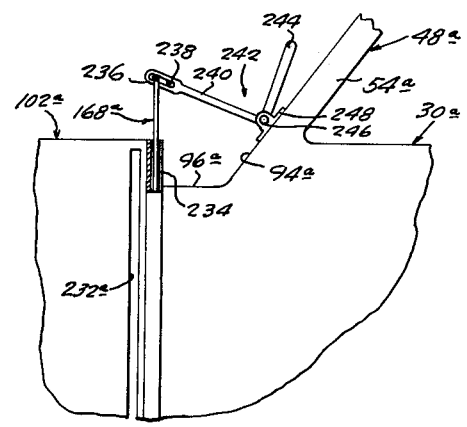
FIGURE 9 is a fragmentary side elevation, partly broken away and in section, showing details of the manually operated answer occluding and exposing shutter.

The form of projector shown in FIGURES 7 to 9, and generally designated 12a, is broadly similar in construction to that hereinabove described, except that the shutter disc is vertically movable and is manually operated. Further, in this embodiment, the step-down transformer 74a is housed within the lower housing section 28a, and the lever 48a is pivoted, at its rear end, as indicated at 50a, on the top of the side wall of the upper housing section 30, at the rear end thereof, and the switches 56a and 120a for the projection bulb 64a, and the timer motor 116a, respectively, are located on the top of the upper housing section side wall 42a.

The shutter disc 168a is rectangular and works vertically through a transverse slot 169a provided in the upper housing section tube 96a in vertical channel guides 234 at opposite sides of the housing 102a. The shutter disc 168a has lateral stop ears 235, at its upper edge, which engage the upper ends of the guides 234 and limit downward movement of the shutter disc. The shutter disc 168a has, on its upper edge, a centered pair of ears 235, across which a pin 236 extends which is engaged slidably and rotatably through a closed longitudinal slot 238, provided in the horizontal arm 240 of a bellcrank 242, having an upstanding right-angularly related handle arm 244. The bellcrank 242 is pivoted, as indicated at 246, on a bracket 248 on the terminal 54a of the lever 48, at the meeting of the arms 240 and 244. In this arrangement the shutter disc 168a does not have an answer material area exposing opening, and is normally in gravity-depressed occluding position, and requires that the handle arm 244 be moved rearwardly, by hand, to elevate the shutter disc for exposing, for projection, the answer material area 224 of a slide 208. Otherwise the operation of the projector 12a is the same as for the projector 12 of FIGURES 1 to 6.

Although there have been shown and described preferred forms of the invention, it is to be understood that the invention is not necessarily confined thereto, and that any change or changes in the structure of and in the relative arrangements of components thereof are contemplated as being within the scope of the invention as defined by the claims appended hereto.

What is claimed is:

1. A projector game apparatus comprising a support, a lens system on the support, a lamp on the support behind the lens system, a slide holder interposed in and aligned with the lens system, a slide removably engaged in the holder and having a transparency, said transparency having a question material area adjacent to its bottom and an answer material area adjacent to its top, a movable shutter mounted on the support to occlude the answer material area in one position of the shutter and to expose the answer material area in another position of the shutter, and means for operating the shutter, said shutter comprising an axially rotatable opaque disc having an opening corresponding in area to and adapted to be registered with the answer material area of the transparency of the slide in said other position of the shutter.

2. A projector game apparatus comprising a support, a lens system on the support, a lamp on the support behind the lens system, a slide holder interposed in and aligned with the lens system, a slide removably engaged in the holder and having a transparency, said transparency having a question material area adjacent to its bottom and an answer material area adjacent to its top, a movable shutter mounted on the support to occlude the answer material area in one position of the shutter and to expose the answer material area in another position of the shutter, and means for operating the shutter, said shutter comprising an axially rotatable opaque disc having an opening corresponding in area to and adapted to be registered with the answer material area of the transparency of the slide in said other position of the shutter, said operating means comprising a time-controlled motor.

3. A projector game apparatus comprising a support, a lens system on the support, a lamp on the support behind the lens system, a slide holder interposed in and aligned with the lens system, a slide removably engaged in the holder and having a transparency, said transparency having a question material area adjacent to its bottom and an answer material area adjacent to its top, a movable shutter mounted on the support to occlude the answer material area in one position of the shutter and to expose the answer material area in another position of the shutter, and means for operating the shutter, said shutter comprising an axially rotatable opaque disc having an opening corresponding in area to and adapted to be registered with the answer material area of the transparency of the slide in said other position of the shutter, said operating means comprising a time-controlled motor, said motor being spring operated.

4. A projector game apparatus comprising a support, a lens system on the support, a lamp on the support behind the lens system, a slide holder interposed in and aligned with the lens system, a slide removably engaged in the holder and having a transparency, said transparency having a question material area adjacent to its bottom and an answer material area adjacent to its loop, a movable shutter mounted on the support to occlude the answer material area in one position of the shutter and to expose the answer material area in another position of the shutter, and means for operating the shutter, said shutter comprising a vertically movable opaque shutter plate slidably mounted on the support, said shutter plate being adapted to be depressed to occlude the answer material area of the slide and elevated to expose said answer material area, and means limiting downward movement of the shutter disc, said operating means comprising a bellcrank pivoted on the support and having a horizontal arm and a vertical handle arm, and pin and slot means connecting the horizontal arm to the shutter disc.

5. A projector game apparatus comprising a support, a lens system on the support, a lamp on the support behind the lens system, a slide holder interposed in and aligned with the lens system, a slide removably engaged in the holder and having a transparency, said transparency having a question material area adjacent to its bottom and an answer material area adjacent to its top, a movable shutter mounted on the support to occlude the answer material area in one position of the shutter and to expose the answer material area in another position of the shutter, and means for operating the shutter, a timer motor mounted on the support beneath the lens system and having a vertical rotary timer disc mounted on the support and operatively connected to the timer motor, said disc having an upper part positioned behind the slide holder and interposed in the lens system, said timer disc having a circle of successive translucent numerals extending around the peripheral edge, through which light from the lamp passes and is projected by the lens system.

6. A projector game apparatus comprising a support, a lens system on the support, a lamp on the support behind the lens system, a slide holder interposed in and aligned with the lens system, a slide removably engaged in the holder and having a transparency, said transparency having a question material area adjacent to its bottom and an answer material area adjacent to its top, a rotary apertured shutter mounted on the support to occlude the answer material area in one position of the shutter and to expose the answer material area in another position of the shutter, and timed means for operating the shutter, said support comprising a base, a housing mounted upon the base comprising a lower section and an overlying upper section, a rear portion of said lens system being enclosed in said upper housing section, said upper section having a tube on its forward end axially aligned with the lens system, said tube having a side wall having a slot in its top through which the rotary shutter works, a lens tube housing on and extending forwardly from said tube and having an internal annular flange at its rear end defining an opening aligned with the tube, a lens tube slidably engaged in the lens tube housing and containing a forward portion of the lens system, the side wall of the lens tube having diametrically opposed vertical side-receiving slots at the forward side of said internal flange.

7. Projector game apparatus comprising a base having forward and rear ends, a lever having a rear end pivoted on the base at the rear end of the base, said lever extending forwardly over the base, and having a forward end, a housing fixed to and overlying the lever, said housing having a bottom wall normally resting upon the base, housing elevating and depressing means located at the forward ends of and coacting with the base and housing, said housing containing a slide-projecting lens system, said housing comprising a horizontal lower section having a bottom wall normally resting upon the base, and an upper horizontal section, the lower section having a top wall separating the sections, said lens system being confined in said upper section, said upper section terminating at its forward end in a tube formed with top and bottom openings, a time-controlled motor mounted atop the upper section, a rotary shutter operatively connected to the time-controlled motor, said shutter having opening means adapted at times to register with the lens system, a timer motor within the forward part of the lower housing section, a timer disc having a circle of consecutive translucent numerals extending therearound adapted at times to register with the shutter opening means and the lens system, said timer disc being operatively connected to the timer motor, and a projecting lens assembly mounted on the housing in front of the discs and aligned with the lens system in the upper housing section.

8. Projector game apparatus according to claim 7, wherein said lens system comprises a pair of opposed plano-convex lenses, an electric bulb supported behind the lenses, and a step-down transformer, said transformer being located within the rear part of the lower housing section and operatively connected to the bulb.

References Cited by the Examiner
UNITED STATES PATENTS

| | | | |
|---|---|---|---|
| Re 23,030 | 8/48 | Holt | 35—9 |
| 973,003 | 10/10 | Coughlin | 88—27 |
| 1,097,310 | 5/14 | Ginter | 88—27 |
| 1,550,320 | 8/25 | Isbiels | 88—24 |
| 2,334,329 | 11/43 | Isaacson | 88—28 |
| 2,394,711 | 2/46 | Miesegaes | 35—9 |
| 2,696,961 | 12/54 | Fox | 248—11 |
| 2,939,659 | 6/60 | Koselka | 248—11 |
| 3,107,435 | 10/63 | Skinner | 35—9 |
| 3,120,708 | 2/46 | Silber | 35—9 |

NORTON ANSHER, *Primary Examiner.*

EMIL G. ANDERSON, *Examiner.*